June 19, 1945.  A. ACKRON  2,378,376
HEATING PLANT
Filed Sept. 30, 1942  3 Sheets-Sheet 1
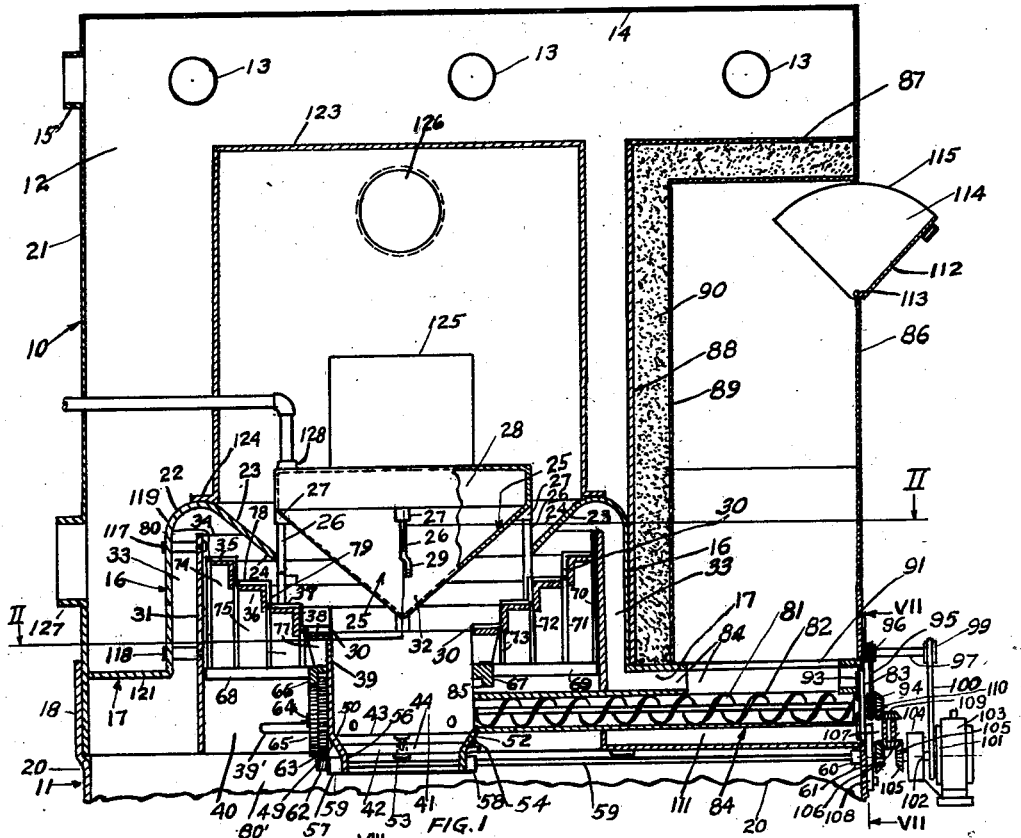
FIG. 1
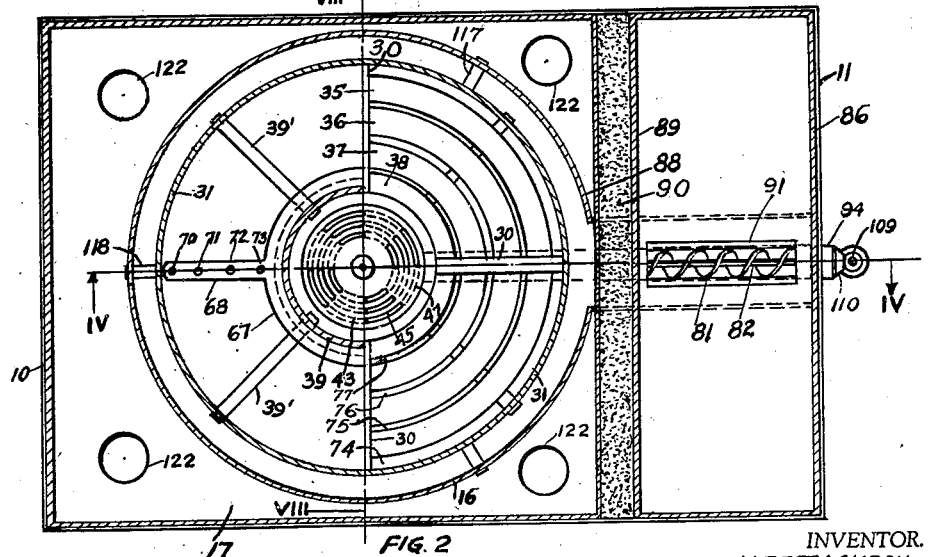
FIG. 2
INVENTOR.
ALBERT ACKRON
BY 
ATTORNEY June 19, 1945.    A. ACKRON    2,378,376
HEATING PLANT
Filed Sept. 30, 1942    3 Sheets-Sheet 2
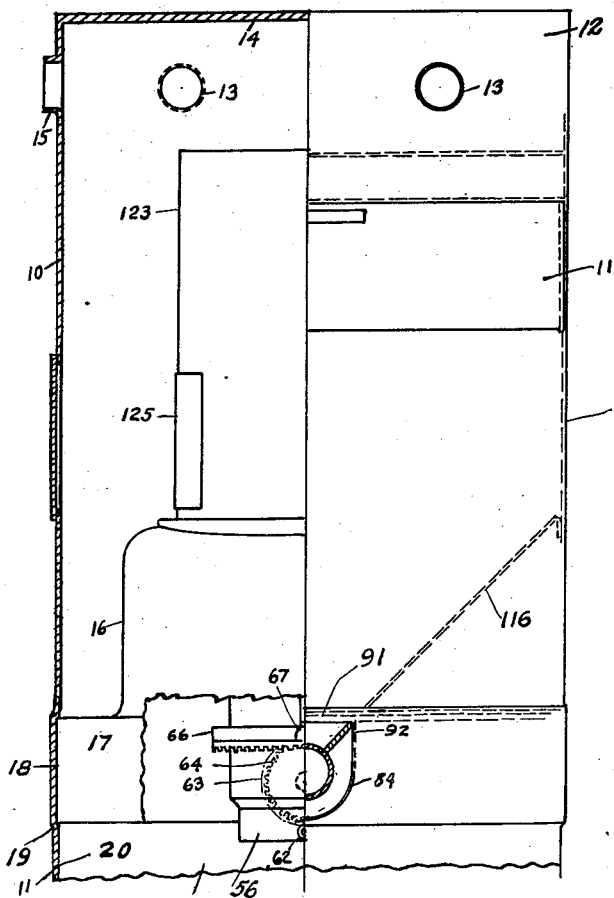
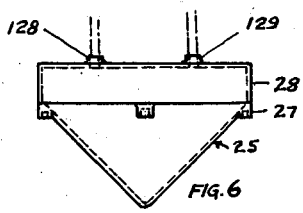
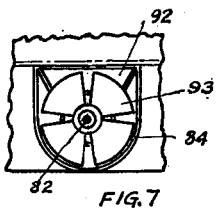
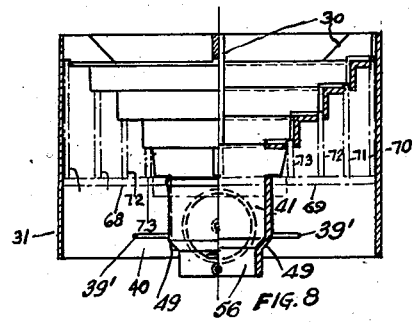
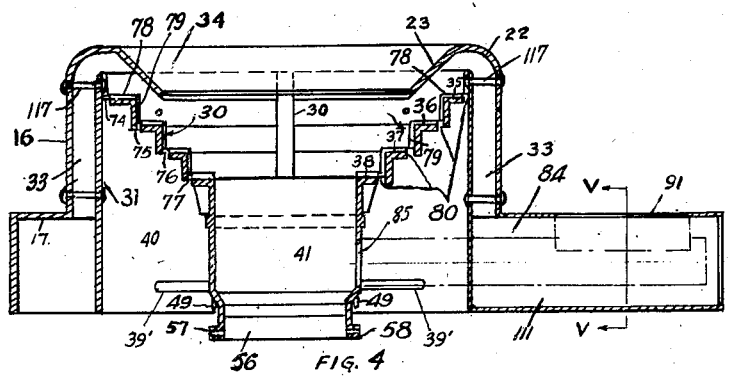
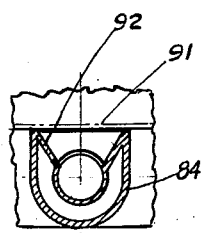
INVENTOR.
ALBERT ACKRON
BY Harry C. Hunter
ATTORNEY June 19, 1945.  A. ACKRON  2,378,376
HEATING PLANT
Filed Sept. 30, 1942  3 Sheets-Sheet 3
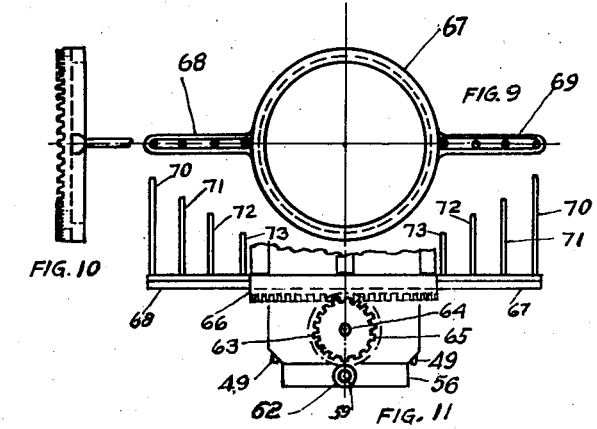
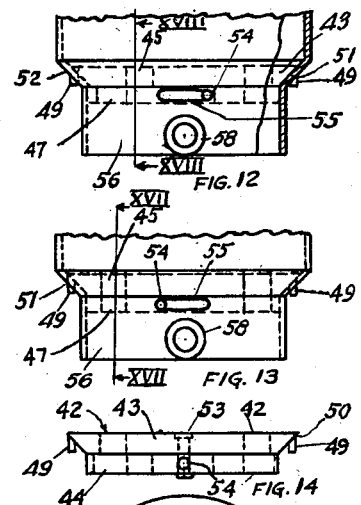
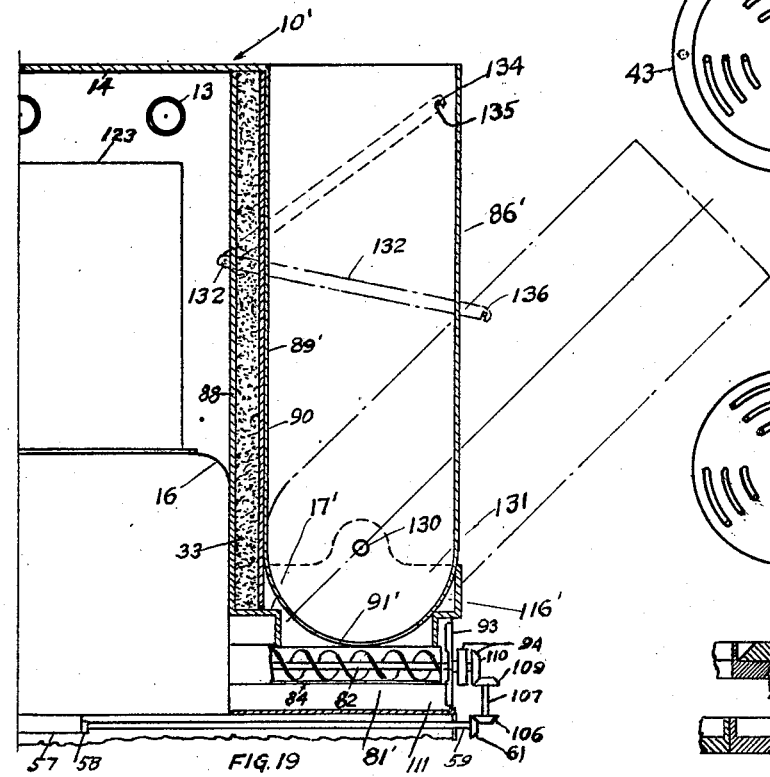
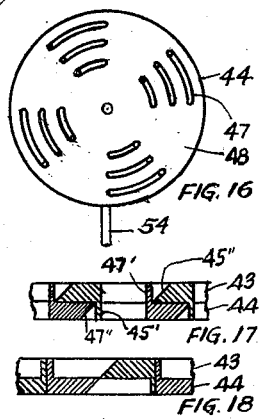
INVENTOR.
ALBERT ACKRON
BY Harry C. Alberts
ATTORNEY Patented June 19, 1945

2,378,376

UNITED STATES PATENT OFFICE 2,378,376

HEATING PLANT

Albert Ackron, Chicago, Ill.

Application September 30, 1942, Serial No. 460,294

4 Claims. (Cl. 110—45)

This invention relates to heating plants and more particularly to automatic solid fuel feeding combustion units, although certain features thereof may be employed with equal advantage for other purposes.

It contemplates more especially the provision of an improved, compact and self-contained coal burning heating plant having automatic fuel feeding instrumentalities. This application is a continuation-in-part of forfeited application Serial Number 357,831, filed September 23, 1940.

Numerous types of automatic solid fuel feeding devices have heretofore been proposed for heating plants of the hot air, hot water and steam heating systems. These usually take the form of structures that constitute an external attachment to the heating plant. As a result, a great deal of space is required in conjunction with the heating plant and the external attachment serves as an obstruction owing to this comparatively large space requirement. Then, too, the expense of providing an external attachment is appreciable as an addition to the initial heating plant unit in that heating plants and stokers are usually produced by different firms so that one is not especially designed for the other and are separately handled as a distinct transaction which involves duplicate transportation, labor and installation costs.

It is proposed with the teachings of the present invention to provide self-contained heating and solid fuel feeding instrumentalities to constitute an integral unit. This is accomplished without requiring any appreciable additional space than is usually occupied by the customary heating plant and shall involve a single installation cost in that the self-contained heat producing and fuel feeding instrumentalities are assembled at the factory to constitute a single unit. This provides specially designed and more efficient fuel feeding as well as heat combustion instrumentalities that are especially designed for co-ordinating operation in any particular type of heating plant to constitute a self-contained complete unit.

This in itself minimizes the space requirements and there is only a single installation cost for a self-contained unit that is less expensive than the combination heating plant and stokers that now commonly constitute an external attachment thereto.

One object of the present invention is to simplify the construction and improve the operation of devices of the character mentioned.

Another object is to provide an improved, compact and self-contained solid fuel heating producing device in combination with self-contained fuel feeding means therefor.

Still another object is to provide an improved heating plant having a fuel storage chamber and automatic feeding instrumentalities contained therein to provide a compact, more efficient and less expensive heating plant.

A further object is to provide means for effecting intense combustion in the upper strata of a solid fuel bed for progressive downward consumption responsive to forced draft operation.

A still further object is to provide means for producing ash residue from solid fuel such as coal in the upper rather than lower portion of the combustion chamber where the fuel remains substantially in its initial condition.

Still a further object is to provide improved means for effecting ash disposal in a self-contained combustion unit without interruption or impairment to fuel feeding and combustion.

An addition object is to provide a fuel hopper in a self-contained combustion unit that is insulated and cooled to avoid coking and the formation of volatile gases outside of the combustion chamber.

Other objects and advantages will appear from the following description of an illustrative embodiment of the present invention.

In the drawings:

Figure 1 is a side sectional view in elevation of a hot air furnace type of heating plant embodying teachings of the present invention, the fuel and ash spreading cone being only shown in partial section to better illustrate the appurtenances thereto.

Figure 2 is a sectional view in elevation taken substantially along line II—II of Figure 1.

Figure 3 is a front view in elevation of the heating plant shown in Figure 1, the heating plant casing being shown in quarter-section with the combustion chamber broken away to clarify the showing.

Figure 4 is a fragmentary sectional view of the grate and combustion chamber taken substantially along line IV—IV of Figure 2.

Figure 5 is a fragmentary sectional view in elevation of the air and fuel conveyor duct taken substantially along line V—V of Figure 4.

Figure 6 is a fragmentary view in elevation of the cone spreading device shown in Figure 1.

Figure 7 is a fragmentary sectional view showing the fan or lower element along substantially line VII—VII of Figure 1.

Figure 8 is a sectional view in elevation of the combustion chamber taken substantially along line VIII—VIII of Figure 2, the grate cleaning instrumentalities being shown in dotted outline.

Figure 9 is a fragmentary plan view of the grate cleaning device shown in Figure 1.

Figure 10 is a left end view of the grate cleaning device shown in Figure 9.

Figure 11 is a fragmentary view in elevation of the grate cleaning and actuating mechanism shown in Figures 1 and 3.

Figure 12 is a detailed view in elevation of the lower end portion of the combustion chamber with the perforated bottom plate member shown shifted to one extreme position.

Figure 13 is a detailed view in elevation of the lower end portion of the combustion chamber with the perforated bottom plate member shown shifted to the other extreme position.

Figure 14 is a front view in elevation of the combustion chamber bottom plate shown in assembled association.

Figure 15 is a plan view of the uppermost bottom plate of the combustion chamber.

Figure 16 is a plan view of the lowermost bottom plate of the combustion chamber.

Figure 17 is a fragmentary sectional view of the combustion chamber bottom taken through aligned slots substantially along line XVII—XVII of Figure 13 showing the apertured plates fully opened.

Figure 18 is a fragmentary sectional view of the combustion chamber bottom taken substantially along line XVIII—XVIII of Figure 12 showing the apertured plates fully closed.

Figure 19 is a fragmentary half-sectional view of a heating plant similar to that shown in Figures 1 and 2 with a modified solid fuel hopper.

The structure selected for illustration comprises a hot-air furnace which, in this instance, is of substantially rectangular configuration defined by a casing 10 which preferably though not essentially is of sheet metal construction. The casing 10 has a base 11 serving as a support therefor on the basement floor or any other supporting surface. As shown, the casing 10 extends upwardly to present an enclosed heating chamber 12 that has a plurality of heat discharge ports 13 provided around the casing 10 proximate to the top 14 thereof.

The heat discharge ports 13 are defined by exteriorly projecting flanges 15 to which the heat conducting pipes (not shown) are telescopically attached to convey the heated air from the casing chamber to any desired space or rooms to be heated therewith. A cylindrical vertical firepot 16 is cast or otherwise shaped from heavy sheet material for support by a flanged ring 17 that extends around the interior walls of the casing 10 to serve as a complement of an outwardly offset peripheral flange 18 presenting a peripheral shoulder 19 around the lower portion 20 of the casing 10.

The upper portion 21 of the casing 10 is telescopically received within the outwardly offset lower casing flange 18 so that it will rest upon the firepot ring 17 for telescopic reception within the flange 18 of the lower casing section 20. This presents a sectional casing 10 consisting of a lower ash confining portion 20 and an upper heat confining portion 21 to enable ready access to the interior of the firepot 16 and its associated instrumentalities to be hereinafter described.

The fire pot 16 terminates upwardly, in this instance, in an inwardly curved flared flange 22 terminating in a downwardly flared apron 23 that presents an enlarged circular orifice 24. The inwardly curved flange 22 defining the orifice 24 cooperates with a fuel and ash spreading cone 25 which is axially and upwardly supported by a plurality of depending brackets 26, in this instance four, which extend from bosses 27 formed integral with the upper cylindrical portion 28 of the fuel and ash spreading cone 25. The depending brackets 26 have their lower extremities 29 laterally offset for attachment by any suitable expedient such as spot welding or riveting, to angularly disposed and vertically offset plates 30, in this instance four, that are supported by and serve to maintain parts of a combustion shell 31 in assembled association.

It should be noted that the fuel and ash spreader 25 is tapered downwardly to terminate in a downward extremity 32 positioned axially of the firepot 16. The firepot 16 has, in this instance, an inwardly spaced and centrally disposed combustion shell 31 which is shaped to correspond with the firepot 16 and of smaller cross-section, it being circumferentially spaced therein to present an annular air chamber 33 in relation therewith. It is to be noted that the combustion shell 31 terminates in an upward peripheral edge 34 that is upraised from a series of downwardly and inwardly stepped flanges 35, 36, 37, and 38, in this instance four, to present a terraced upper wall flared extension in the region of the fuel and ash spreading cone 25 that is disposed thereabove in axial relation therewith. The flared extension with its lowermost stepped flange 38 of the combustion shell 31 terminates in a depending cylindrical wall 39 that is concentrically spaced from and presents an annular chamber 40 exteriorly thereof in relation to the outer cylindrical wall 39 of the shell 31. The cylindrical combustion chamber wall 39 is supported by radial braces 39' anchored to the combustion shell 31.

The cylindrical wall 39 defines a fuel receiving and combustion chamber 41 that is disposed concentrically of the axially positioned fuel and ash spreader cone 25 suspended above in the path thereof. As shown, the fuel receiving and combustion chamber 41 together with its concentric exterior annular space 40 within the combustion shell 31, is disposed above a circular bottom fuel supporting unit 42. The circular fuel supporting unit 42 consists of an upper and lower section 43 and 44, respectively, which are mounted within the combustion shell 31 proximate to the lower peripheral open edge thereof.

The upper circular plate section 43 consists of a circular plate (Figures 14 and 15) which has a plurality of concentrically spaced arcuate slots 45 that are positioned along radial spaced quadrants with solid intervening spaces 46 to admit air therethrough. The lower plate section 44 is somewhat smaller in diameter and is provided with correspondingly spaced arcuate slots 47 with intervening solid portions 48 for alignment or misalignment with the corresponding slots 45 and intervening solid portions 46 of the upper plate 43, depending upon their relative rotary adjustment. In order to preclude clogging of the arcuate slots 45—47 in the upper and lower plate sections 43—44, respectively, the latter are respectively provided with downwardly and upwardly projecting lugs 45'—47' that extend into the arcuate slots 47—45 respectively, of the other mating plates to serve as slot scrapers. This relative movement between the plates 43—44 responsive to the manual displacement of the rod 54 within the limit of the slot 55, will remove any deposits in the arcuate slots 45—47 which preferably are tapered as at 45"—47" to avoid sticking and to insure free rotary movement. Solid particles such as clinkers or even coal as loaded in the circular slots 45—47, will be crushed by the lugs 45'—47' and permit the pulverized residue to drop therethrough. The upper fuel supporting plate 43 is, in this instance, provided with a plurality of circumferentially spaced studs 49 depending from the flared peripheral edge 50 thereof for registry with correspondingly sized and spaced apertures 51 (Figure 12) provided in a correspondingly inclined or flared portion 52 of the fuel receiving and combustion chamber 41 (Figures 1 and 12).

With this arrangement, the upper fuel supporting plate 43 is maintained stationary to comprise an apertured body for the fuel receiving combustion chamber 41. The correspondingly apertured lower plate 44 is of smaller diameter than the upper plate 43, and these are rotatively connected together by an axial pivot 53. The pivot 53 is axially fixed to the upper plate 43 and projects downwardly through the lower plate 44 which is journalled thereon for rotation relative to the upper plate 43.

In order to rotatively shift the lower plate 44 relative to the upper plate 43, a rod 54 extends radially from the peripheral edge of the lower plate 44, thereby affording the manual grasp thereof to position the lower plate 44 relative to the upper plate 43 with the slots 45—47 in partial or complete registry or totally out of registry to regulate the amount of air passing therethrough to the fuel receiving and combustion chamber 41.

The radially extending rod 54 is rendered accessible through a slot 55 provided in the cylindrical bottom portion 56 constituting a reduced extension of the fuel receiving and combustion chamber 41. The slot 55 is sized to freely receive the rod 54 (Figure 13) and the slot extremities serve to index the position of the lower plate 44 to place the slots 45—46 totally out of registry when shifted to the extreme left (Figure 12), and in complete registry for the maximum passage of air therethrough when shifted to the extreme right (Figure 13).

The lower cylindrical combustion chamber extension 56 is, in this instance, provided with diametrically disposed aligned bearings 57—58 that are mounted thereon to rotatively support a drive shaft 59 journalled therein.

Another bearing 60 is fixed to the base 20 of the shell 10 (Figure 1) to support the drive shaft 59 proximate to its externally projecting extremity that carries a bevel gear 61 constituting a train of gears to the power source, as will appear more fully hereinafter. The drive shaft 59 carries a worm 62 at its other extremity which projects beyond the bearing 57 to mesh with a worm wheel 63 journalled on a stub shaft 64 anchored to the fuel receiving and combustion chamber 41 (Figure 1). The worm wheel 63 is attached to a spur gear 65 that is also journalled on the stub shaft 64, to mesh with the teeth 66 provided on a circular rack 67. The circular rack 67 (Figure 9) constitutes part of diametrically disposed arms 68—69 formed integral therewith. Each of the arms 68—69 support a plurality of vertically disposed rods 70, 71, 72 and 73 that are equidistantly spaced therealong for fixed connection thereto.

The rods 70, 71, 72 and 73 are progressively shorter in length toward the center to correspond with the distance between the arms 68—69, on one hand, and the series of downwardly and inwardly stepped flanges 35, 36, 37, and 38 which are separated from each other by circular spaces 74, 75, 76 and 77 to freely receive the upper extremities of each set of rods 70, 71, 72 and 73 therethrough. The circular spaces 74, 75, 76 and 77 serve to provide a passage for the ashes that are disposed upon the flanges 35, 36, 37 and 38 as the fuel burns to release the products of combustion and the heat energy therefrom. The rods 70, 71, 72 and 73 rotate in the circular spaces 74, 75, 76 and 77 to maintain such free from any clinkers and deposits that do not freely pass therethrough, thereby maintaining the circular spaces or ash passages 74, 75, 76 and 77 clear at all times.

Because of the spaced relation between downwardly and inwardly spaced stepped flanges 35, 36, 37 and 38, the vertically extending radially projecting plates 30 have their lower edges 78 stepped to conform therewith for attachment thereto by welding or other suitable securing expedient. The opposite edges 79 of the plates 30 are downwardly inclined to conform with the inclination of the inwardly and downwardly projecting firepot flange 23 for joinder thereto, thereby maintaining the inwardly and downwardly series of steps 35, 36, 37 and 38 in rigid spaced relation to serve as a grate for the fuel spread thereover in a comparatively thin layer as displaced upwardly from the fuel receiving chamber 41.

So that the upper extremities of the rods 70, 71, 72 and 73 will clear the radially disposed step bracing plates 30, notches 80 are provided in the stepped edge 78 thereof proximate to their corners complemental and in vertical alignment with the concentric spaces 74, 75, 76 and 11. This enables the extremities of the rods 70, 71, 72 and 73 to project entirely through the concentric spaces 74, 75, 76, 77 and still clear the radial bracket plates 30.

This affords a constant cleaning of the concentric ash passages 74, 75, 76, 77 and precludes the clogging thereof so that these spaces are always free. Rotation is effected responsive to the operation of the fuel feeding means to be hereinafter described. This rotation or movement of the rods 70, 71, 72, and 73 create some vibration that encourages the deposit of ash residue from the fuel to drop into an ash chamber 80' formed beneath the combustion shell 31 which communicates with ash conveying instrumentalities or a receiving receptacle to provide for the removal thereof.

Solid fuel such as coal is fed to the combustion chamber 41 proximate to the bottom plates 43—44 by means of a conveyor worm 81 fixed to an axial shaft 82 which is journalled at its forward end in a bearing bracket 83 constituting a detachable plate closure for a conveyor housing 84 that is shaped to receive the conveyor worm 81. The conveyor housing 84 communicates at its inward discharge end 85 with the combustion chamber 41 so that the conveyor worm 81 may project through to discharge the fuel such as coal onto the superposed plates 43—44. The coal is deposited in a hopper 86 that is built into the upper casing section 21 to constitute a complement thereof. The hopper 86 is fitted into a correspondingly shaped recess 87 provided in the casing section 21 for compactness and confinement within the usual contour thereof. The hopper 86 is insulated from the combustion shell 31 by means of a wall 88 spaced from the wall 89 of the hopper 86 to receive insulation 90 that surrounds the hopper 86 on all sides except the exteriorly exposed wall and bottom thereof. The insulation 90, the air chamber 33, and the air draft that is provided through the fuel feeding housing 84, prevents the transmission of heat to the unburned coal in the hopper 86 thereby avoiding the coking thereof and the formation of volatile gases therefrom. The heat of combustion produced within the upper heating chamber 12 and the combustion chamber 41 is for the most part utilized in heating the air in the casing chamber 12.

The coal is deposited responsive to the urge of gravity through an opening 91 provided in the bottom of the hopper 86 immediately above the feeding worm 81. To this end, the lower hopper opening 91 communicates with a passage 92 (Figure 5) provided in the adjacent top of the conveyor housing 84.

The rotation of the fuel feeding worm 81 is accompanied with the rotary displacement of the circular rack 67 with its arms 68—69 disposed below the stepped flanges 35, 36, 37, and 38 to displace the rods 70, 71, 72 and 73 around these concentric passages 74, 75, 76 and 77. An air fan 93 loosely revolving over the conveyor shaft 82 proximate to its forward extremity is independently driven at a higher speed of rotation than the worm 81 by a pulley 94 fixed to the conveyor shaft 82 beyond the walls of the casing 10. An endless belt 95 frictionally engages the periphery of the pulley 94 which is in alignment with another pulley 96 fixed to a stub shaft 97 journalled for support parallel to the conveyor belt 82.

A pulley 99 fixed to the end of the stub shaft 97 carries an endless belt 100 over another pulley 101 fixed to the armature shaft 102 of an electric motor 103 to directly drive the fan 93 which, should commercial practice so dictate, could be substituted by a high capacity blower of standard construction. The armature shaft 102 is operatively connected to a speed reducer 104 beyond the pulley 101 to rotate a bevel gear 105 at a substantially lower speed to mesh with a bevel gear 106 carried by a vertical shaft 107. The shaft 107 is journalled in a vertical bearing 108, and another bevel gear 109 is fixed to the upper extremity thereof to mesh with a bevel gear 110 fixed to the extremity of the conveyor shaft 82 beyond the pulley 94.

Consequently, the worm 81 will be rotated at a substantially lower speed than the fan 93, and rotation corresponding to that of the worm 81 is imparted to the circular rack 67 through the bevel gear 61 that meshes with the bevel gear 106 serving as an idler between the motor shaft gear 105 and the fan gear 110. The fan 93 which is driven at a substantially higher velocity than the shafts 59—82, establishes a forced draft through an air conduit 111 that surrounds the housing 84.

The forced draft serves to direct air above the coal which is displaced in the form of an expansive inclined layer supported on the stepped flanges 35, 36, 37 and 38 by passing through the conveyor housing 84 around the conveyor passage 92 therein and through the conduit 111 around the annular space 33 which communicates with the central chamber 41 and the space thereabove and below the spreading cone 25 to induce complete combustion of the fuel from the top down while the fuel is fed from the bottom up. Consequently, effective feeding rotation is simultaneously imparted to the fuel feeding conveyor 81, the forced draft instrumentalities 93, and the ash cleaning mechanism comprising the annular rack 67, its affixed arms 68—69, and the upstanding rods 74, 75, 76 and 77 anchored thereto. The operation of the motor 103 may be regulated by an automatic thermostat or other controls which are of well-known construction and constitute standard heat regulating equipment.

The hopper 86 is preferably charged with coal through a door 112 that is hinged along its bottom edge, as at 113 to the exterior wall of the hopper 86. The door 112 is provided with side plates 114 that have an arcuate exterior edge 115 to permit the pivotal movement of the door 112 relative to its hinge 113 and serve to guide the coal into the hopper 86. So that the interior receptacle of the coal charging door 112 may not be disposed beyond reach of the average attendant, the entire casing 10 is preferably though not essentially mounted into a pit below the floor surface of a basement to render it convenient to charge the hopper 12.

It should be noted that the lower side walls of the hopper 112 are inclined as at 116 (Figure 3) for convergence proximate to the bottom opening 91 therein, thereby insuring that the coal will gravitate therethrough for feeding to the combustion chamber 41 responsive to the rotation of the conveyor worm 81 that is operated responsive to the rotation of the motor 103 directly geared thereto. As shown, the vertical firepot shell 16 may be of sectional construction with the parts thereof complemental to each other in close fitting engagement through the medium of peripheral interfitting flanges 117—118. This enables assembly of the fire-pot 16 from sectional members 119, 120 and 121 for convenience in manufacture and construction.

A plurality of flanged openings 122, in this instance four (Figure 2), provided in the flanged ring 17 provide for the supply of air from the room wherein the heating unit 10 is situated, and this air enters the air chamber 12 around a heating chamber 123 to serve as a carrier of heat therefrom. The heating chamber 123 is peripherally flanged as at 124 for attachment to the curved upper edge 22 of the firepot or combustion shell 16. A waste removal door 125 (Figure 3) is provided in a heating chamber 123 to afford access to the interior thereof for cleaning and replacement purposes.

The heating chamber 123 receives the waste products of combustion, which pass through a pipe 126 communicating therewith for connection to the chimney of a building structure, thereby permitting the escape of the waste products of combustion. The heating chamber 123 extends upwardly for a substantial distance within the casing 10 to enable the air to be heated to contact therewith. The air to be heated not only is derived from the room atmosphere that passes through the openings 122 of the flange 17, but also an auxiliary supply of external air from the outside is transmitted to the heating chamber 12 by a pipe 127.

The pipe 127 communicates with the exterior casing 10 and fresh outside air is conducted therethrough by virtue of its extension through the exterior basement wall of a building structure. Fresh air is thus introduced around the combustion shell 16 and the heating chamber 123. This segregates the air to be heated from the waste products of combustion that escape through the heating chamber pipe 126 leading to the outside chimney.

So that hot water may be produced while the fuel is burning primarily to heat the atmosphere in a building structure, the spreader cone 25 is of tubular construction with the interior serving as a water compartment having inlet and outlet water pipe connecting flanges 128—129 (Figure 6) so that cold water may be transmitted thereto and heated water discharged therefrom. The water in the cone spreader 25 also serves to preclude the injury thereto by virtue of its direct contact with the flames produced by the burning fuel directly therebeneath.

In the modified embodiment shown in Figure 19, the coal hopper 86' is of the movable type and is pivoted as at 130 to spaced ears 131 comprising a part of the firepot ring 17'. To this end, the lower extremity 116' of the hopper 86' is of arcuate configuration to correspond with the arc of curvature presented by the mounting pin 130 and its connection to the hopper 86'. The arcuate bottom 116 of the hopper 86' is provided with an opening 91' through which the coal drops responsive to the urge of gravity upon the coal conveyor 81' and journalled therebeneath in a manner described in connection with the preceding embodiment.

The hopper 86' is held in an inclined outward position for convenient charging with coal by means of straps 132 that pivotally engage both side walls of the casing 10' as at 133 to provide an open hook 134 at the free extremities thereof. The strap hooks 134 are engageable with pins 135 and 136 anchored in two spaced positions on each side wall of the hopper 86'. The pins 135 and 136 are positioned on the side walls of the hopper 86' to retain the latter in an operative coal feeding position when the trap hooks 134 engage the pins 135 (shown in full sectional outline in Figure 19 or in an inoperative inclined position when the strap hooks 134 engage the pins 136 for charging with coal (shown in dotted outline in Figure 19). These positions of the hopper 86' depend upon the engagement of the strap hooks 134 with hopper pins 135 or 136, respectively. It will be observed, therefore, that both the stationary type hopper 86 or the movable type hopper 86' may be utilized depending upon the dictates of commercial practice.

Various changes may be made in the embodiment of the invention herein specifically described without departing from the invention or sacrificing any of the advantages or features thereof, and nothing herein shall be construed as limitations upon the invention, its concept or structural embodiment as to the whole or any part thereof except as defined in the appended claims.

I claim:

1. In a heating plant, the combination with a casing of a heating chamber in said casing, a combustion chamber below said heating chamber, feeding means communicating with the bottom of said combustion chamber to feed solid fuel from a source of supply to the lower portion of said fuel chamber, a forced air chamber surrounding said combustion chamber to communicate with the top of said combustion chamber for directing air downwardly therethrough and against the fuel therein, an ash chamber beneath said combustion chamber, there being openings in the fuel supporting surface of said combustion chamber to establish communication between the air chamber and ash chamber through said combustion chamber, and means for forcing air from said air chamber downwardly through said combustion chamber and into said ash chamber to aid in the combustion of the fuel and the displacement of ash downwardly through the openings in said fuel supporting surface.

2. In a heating plant, the combination with a casing of a heating chamber in said casing, a combustion chamber below said heating chamber, a conical extension on said combustion chamber, a conical cone depending into said conical combustion chamber extension to define an upwardly flaring concentric fuel supporting surface therewith, feeding means communicating with the bottom of said combustion chamber to feed solid fuel from a source of supply to the lower portion of said fuel chamber, a forced air chamber surrounding said combustion chamber to communicate with the top of said combustion chamber for directing air downwardly therethrough and against the fuel therein, an ash chamber beneath said combustion chamber, there being openings in the fuel supporting surface of said combustion chamber to establish communication between the air chamber and ash chamber through said combustion chamber, and means for forcing air from said air chamber downwardly through said combustion chamber and into said ash chamber to aid in the combustion of the fuel and the displacement of ash downwardly through the openings in said fuel supporting surface.

3. In a heating plant, the combination with a casing of a heating chamber in said casing, a combustion chamber below said heating chamber, an upwardly flaring extension on said combustion chamber to serve as a fuel supporting surface, said fuel supporting surface extension being provided with concentric steps, feeding means communicating with the bottom of said combustion chamber to feed solid fuel from a source of supply to the lower portion of said fuel chamber, a forced air chamber surrounding said combustion chamber to communicate with the top of said combustion chamber for directing air downwardly therethrough and against the fuel therein, an ash chamber beneath said combustion chamber, there being openings in the fuel supporting surface of said combustion chamber steps to establish communication between the air chamber and ash chamber through said combustion chamber, and means for forcing air from said air chamber downwardly through said combustion chamber and into said ash chamber to aid in the combustion of the fuel and the displacement of ash downwardly through the openings in said fuel supporting surface.

4. In a heating plant, the combination with a casing of a heating chamber in said casing, a combustion chamber below said heating chamber, an upwardly flaring extension on said combustion chamber to serve as a fuel supporting surface, said fuel supporting surface extension being provided with concentric steps, clinker cleaning means extending into the openings of said stepped flaring combustion chamber extension, means for moving said clinker cleaning means in said openings, feeding means communicating with the bottom of said combustion chamber to feed solid fuel from a source of supply to the lower portion of said fuel chamber, a forced air chamber surrounding said combustion chamber to communicate with the top of said combustion chamber for directing air downwardly therethrough and against the fuel therein, an ash chamber beneath said combustion chamber, there being openings in the fuel supporting surface of said combustion chamber steps to establish communication between the air chamber and ash chamber through said combustion chamber, and means for forcing air from said air chamber downwardly through said combustion chamber and into said ash chamber to aid in the combustion of the fuel and the displacement of ash downwardly through the openings in said fuel supporting surface.

ALBERT ACKRON.